United States Patent [19]

Nelson

[11] Patent Number: 4,593,883

[45] Date of Patent: Jun. 10, 1986

[54] PORTABLE LIFTING, LOADING AND TRANSPORTING DEVICE

[76] Inventor: Richard P. Nelson, 3455 Crestline Way, Soquel, Calif. 95073

[21] Appl. No.: 679,708

[22] Filed: Dec. 10, 1984

[51] Int. Cl.⁴ .................... B60P 1/10

[52] U.S. Cl. .................... 254/7 B; 254/100; 254/103; 414/911

[58] Field of Search .................... 414/631, 910, 911; 254/7 R, 7 B, 89 R, 103, 100

[56] References Cited

U.S. PATENT DOCUMENTS

| | | | |
|---|---|---|---|
| 2,997,292 | 8/1961 | Lucker et al. | 254/7 B |
| 3,376,019 | 4/1968 | Weiss | 254/103 |
| 4,189,128 | 2/1980 | Thompson | 254/7 R |
| 4,279,567 | 7/1981 | Thompson | 414/910 |
| 4,462,569 | 7/1984 | Arzouman | 254/89 R |

*Primary Examiner*—Frederick R. Schmidt
*Assistant Examiner*—Judy J. Hartman
*Attorney, Agent, or Firm*—Owen, Wickersham & Erickson

[57] ABSTRACT

A transporting device for lifting a relatively heavy roll of material to a selected level so that it can be moved and loaded onto production apparatus. The device comprises a platform base on casters that supports a fixed vertical, tubular column, within which is mounted an elongated, rotatable screw threadedly engaged to a ballscrew nut that moves up and down with the column when the screw is turned. Connected to the screw nut by a support assembly is a spindle that extends outwardly at a right angle from the column. The screw is driven by an electric motor mounted on the platform base, powered by the battery and connected through a gear reduction unit to the screw. A handle is attached to the platform base for moving the entire device and controllable switches are provided for moving the spindle up and down within preselected limits.

9 Claims, 9 Drawing Figures

PORTABLE LIFTING, LOADING AND TRANSPORTING DEVICE

SPECIFICATION

This invention relates to an improved device for lifting, loading and transporting relatively heavy articles, especially rolls of sheet material such as paper, plastic film, foil and the like.

BACKGROUND OF THE INVENTION

For many industrial processes various sheet materials such as packaging film, paper or foil are normally supplied to automatic machinery in roll form. With the advent of larger and faster packaging machinery, the rolls of packaging material have become larger, containing more lineal feet of material, in order to afford larger machine runs between roll changes. Such larger rolls of material, for example, may typically be approximately 24" in width and 30" in diameter, thus weighing as much as 500 pounds or more. Rolls of such sizes and weights cannot be easily moved or lifted manually, and thus a need arose for a power assisted mechanism to handle them efficiently. In addition, it was found that many packaging applications, such as in the food and medical industries required special handling devices that were sanitary, smaller, and more versatile than conventional fork-lift trucks heretofore used for general freight handling.

It is therefore a general object of the present invention to provide an improved device for lifting and transporting relatively heavy objects such as rolls of sheet material.

Another object of the present invention is to provide a device capable of being manipulated to remove a roll of material from a first location, move it vertically to a different level and transport it to a second location.

Another object of the invention is to provide a lifting and transporting device capable of automatically moving a relatively heavy roll of material vertically to a preselected level and also moving it horizontally to a desired location.

Another more specific object of the invention is to provide a lifting and loading device for heavy rolls of material comprised of a vertical column with a spindle extending perpendicularly therefrom for retaining one such roll and being movable up and down the column with a minimum of friction and/or deflection of components and within preselected vertical upper and lower limits.

SUMMARY OF THE INVENTION

In accordance with the invention, a lifting, loading and transporting device is provided which broadly comprises a tubular mast or column which is supported vertically on a movable base structure. The base has fixed and swivel casters so that is can be easily steered over a flat floor surface. Supported on the base structure is an electrical motor, a battery and an electrical control system for activating the motor. The motor is connected to a gear box which has an output shaft with a first sprocket. The latter is connected by a roller chain to a second sprocket fixed to the lower end of an elongated ball screw which is axially aligned within the tubular column. The ball screw is threadedly engaged with a movable nut within the tubular column and the nut is connected by a pin to a spindle that extends at essentially a right angle from the column. The pin projects through a elongated slot that extends vertically and longitudinally along one side of the column. The end of the spindle is also fixed to a support assembly that fits around the outside of the column and is movable vertically relative to it. Activation of the drive motor turns the ball screw and thus moves the nut with the attached spindle up or down. A control switch arrangement on the motor control enables the travel of the nut and thus the upper and lower limits of the spindle to be controlled and preselected with precision. In use, the device can be moved to a stack of rolls, and then operated to select one roll, lift it therefrom with the spindle, and then move the roll to another location and to another level if necessary before releasing it.

Other objects, advantages and features of the invention will become apparent from the following detailed description of one embodiment thereof presented in conjunction with the accompanying drawing.

DETAILED DESCRIPTION OF EMBODIMENT

Figure 1:
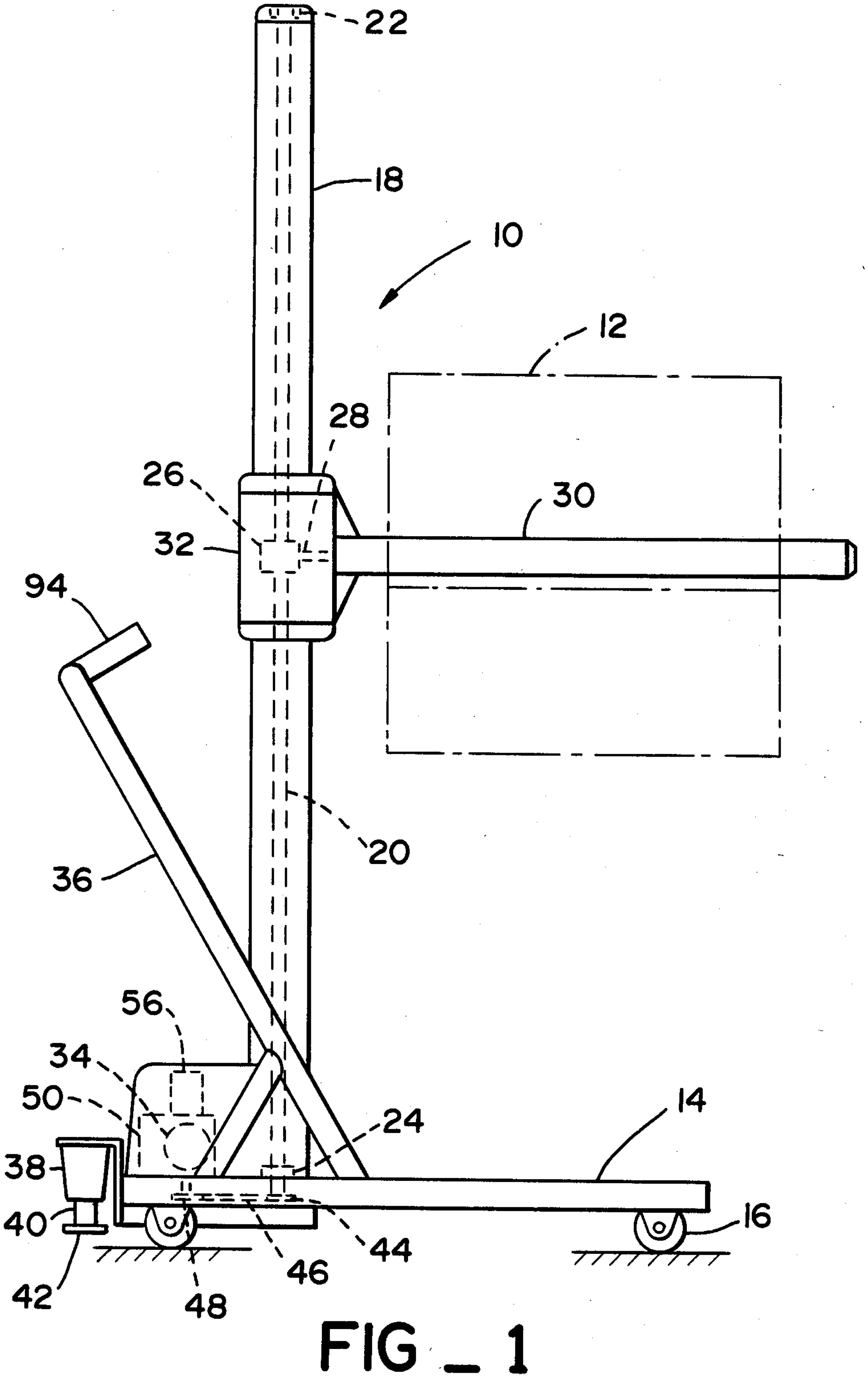
FIG. 1 is a side view in elevation of a lifting, loading and transporting device embodying principles of the present invention.
Figure 2:
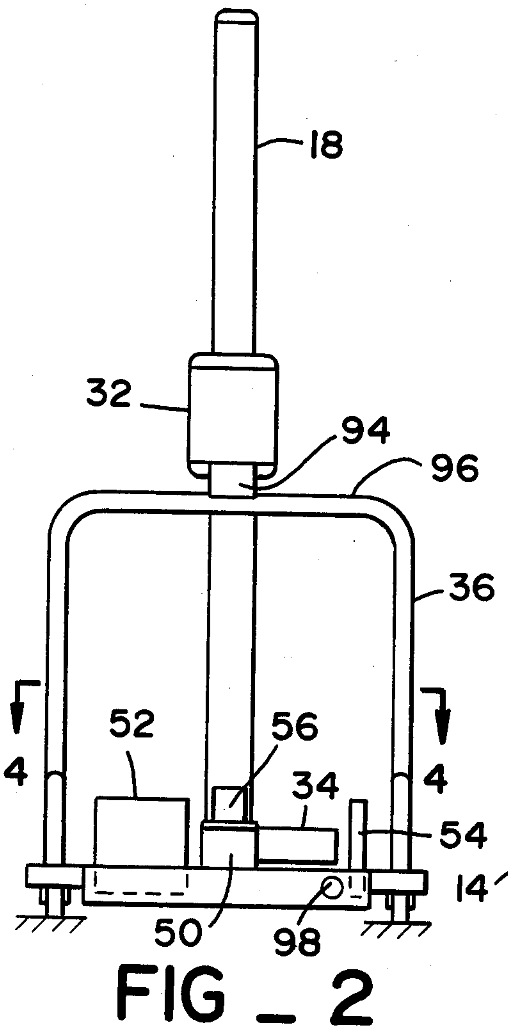
FIG. 2 is a rear view in elevation of the device shown in FIG. 1.
Figure 3:
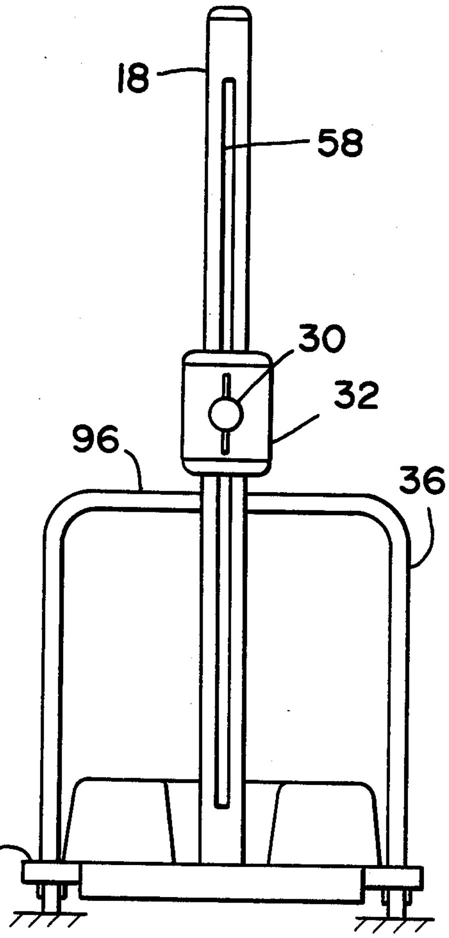
FIG. 3 is a front view in elevation of the device of FIG. 1, shown with a cover over the control components.
Figure 4:
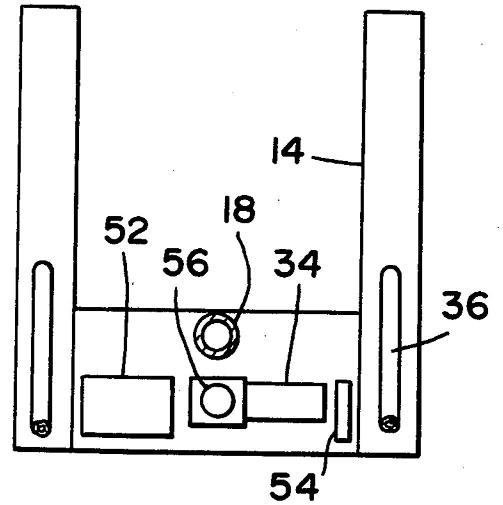
FIG. 4 is a plan view in section taken at like 4—4 of FIG. 2.

With reference to the drawing, FIGS. 1–3 show a transporting and lifting and moving device 10, embodying the principles of the present invention and particularly adapted for lifting and/or moving relatively heavy rolls of material 12 such as metal foil, plastic film or paper. In broad terms, the device comprises a U-shaped base platform 14 with a plurality of swivel casters 16 on its underside and an upright tubular column 18 attached to and extending above the platform. Mounted within the tubular column is a rotatable ball screw 20 which is supported by bearings 22 and 24 within the upper and lower ends of the column. Within the column is a ball-bearing screw nut 26 that is threadedly engaged with an thus movable up and down by rotation of the screw. Extending at a right angle from the column and attached to the screw nut by a pin 28 is a spindle 30 that holds the heavy roll of material. The pin 28 is part of screw-spindle connection assembly 32 that provides the necessary strength and friction reducing factors which enable the spindle to move up and down freely to preselected levels when the ball screw is rotated by a motor 34 mounted on the platform.

A handle 36 made of tubular metal is fixed to the sides of the platform 14 and extends upwardly at an angle toward its rear side and to a convenient height so that it can be comfortably grasped for pushing the entire device over a floor. A foot brake 38 of the well known type is fixed to the back edge of the platform and has a vertically movable member 40 with a lower end pad 42 for engaging the floor surface to hold the device 10 stationary during a loading or unloading operation.

Fixed to the lower end of the drive screw is a driven sprocket 44 which is connected by a roller chain 46 to a drive sprocket 48 that is attached to an output shaft from a gear reduction unit 50 on the motor 34. The motor is preferably a D.C. motor which is powered by a standard automotive storage battery 52 (e.g. 12 volt) that is conveniently mounted near one end of the platform. An electrical panel 54 is provided on the other end of the platform to support the wiring required for the various components of the electrical power system.

Coupled to an auxiliary output shaft of the gear reduction unit 50 is a rotary switch unit 56 for controlling the upper and lower limits of travel of the spindle 30 on the column 18. This switch unit may be of the well know type comprising a bank of rotary cams, each controlling one pair of switch controls and fastened to a common shaft that is coupled to the motor gear reduction unit. Such a switch unit is commercially available, and in the embodiment shown, a model number 4ENMB made by Minarik Electric Company was used. The reduction unit 50 is geared so that its auxiliary shaft, and thus the shaft of the switch unit rotates less than one revolution (e.g. 300°) for the full travel of the spindle between its upper and lower limits. Each of the rotary cams can be adjusted on the cam shaft of the switch unit to limit its amount of rotation and thus the amount of rotation of the ball screw and the up and down travel of the screw nut and spindle. A more detailed description of the control system for the device 10 is provided below with reference to FIG. 9.

Figure 5:
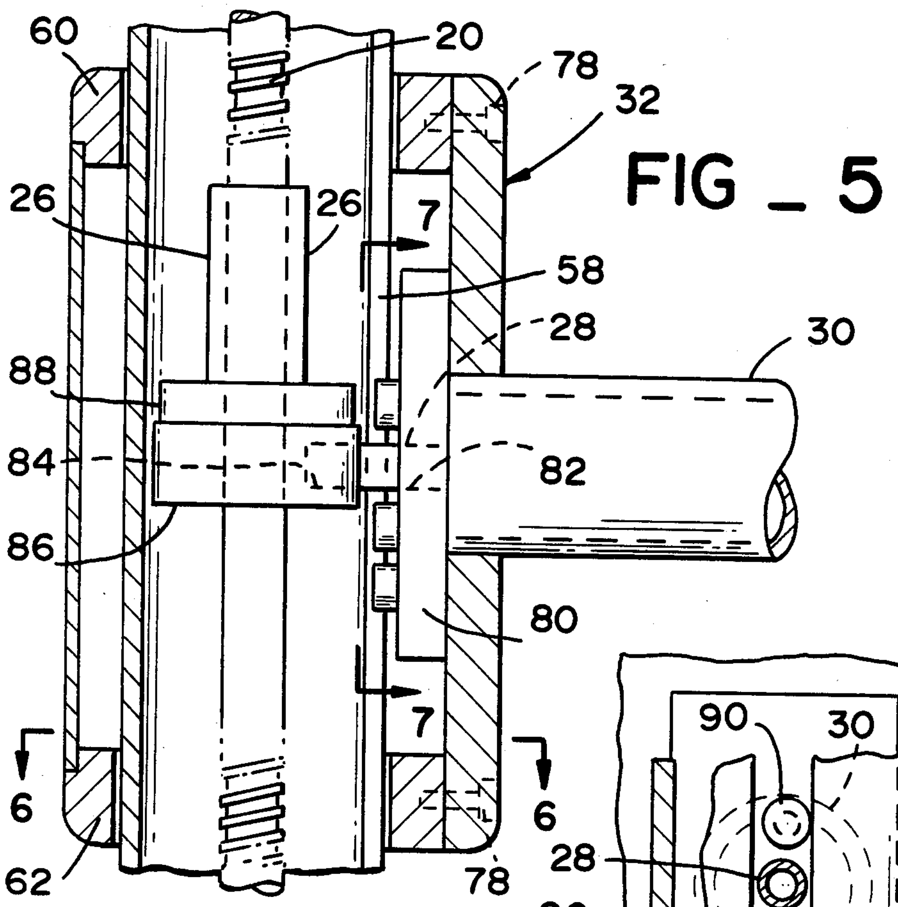
FIG. 5 is an enlarged fragmentary view in section showing components of the spindle connection assembly for the device of FIG. 1.
Figure 6:
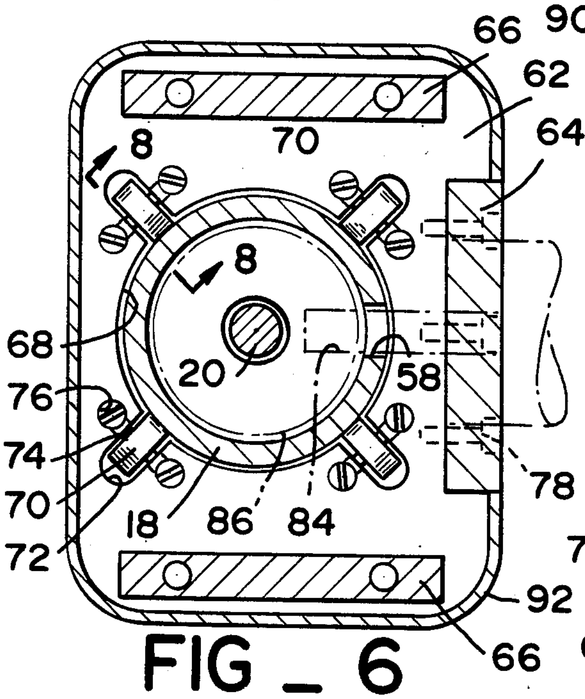
FIG. 6 is a view in section taken along line 6—6 of FIG. 5.
Figure 8:
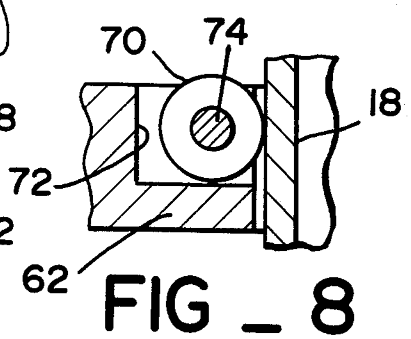
FIG. 8 is a view in section taken along line 8—8 of FIG. 6.

As shown in FIG. 3, the tubular column 18 is provided with an elongated slot 58 through which the pin 28 extends as its moves the spindle up and down. As mentioned previously, the pin is part of the screw-spindle connection assembly 32 which is important to the smooth functioning of the device 10 because it solves the problem of providing adequate structural strength and support while allowing movement of a loaded spindle with a minimum of friction. The screw-spindle connection assembly 32 is shown in greater detail in FIGS. 5–8. In general, it comprises upper and lower rigid end plates 60 and 62 made of relative thick (e.g. 1.2 inches) material and having a rectangular shape with rounded outside corners. These end plates are connected together by a front plate 64 and two side plates 66 to form a box-like structure. As shown in FIG. 6, each end plate has a circular hole 68 having a diameter that is somewhat larger than the outside diameter of the column 18 so that the plates can move relative to the column with ample clearance that provides for no contact between the walls of the holes 68 and the column surface. In order to maintain the aforesaid clearance and keep the column centered within the holes while providing maximum stabilization with minimum friction, a series of four rotatable bearings 70 are mounted within recesses 72 formed within the inner surface of each plate at spaced apart locations around each hole 68. Each bearing is rotatably supported on a short shaft 74 that extends across the recess and is journaled within a pair of cavities 76 on opposite sides of each recess. A short screw retains the bearing shaft within each cavity. The diameter of each bearing is such that it extends outwardly from its recess and into the circular hole 68 by a predetermined small distance so that the four bearings are tangential to a circle that is concentric with and only slightly larger than the outside diameter of the column. Both of the end plates are similarly provided with the bearings as described, and thus they provide for minimal friction of the spindle connection assembly as it is moved up and down the column, despite the load which may be carried by the spindle.

Figure 7:
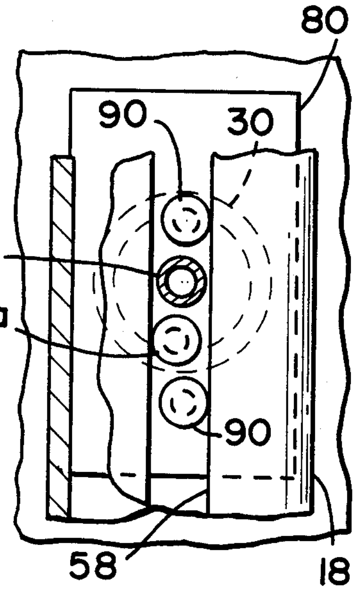
FIG. 7 is a view in section taken along line 7—7 of FIG. 5.

The interconnecting from plate 64 which serves to hold the two end plates 60 and 62 together is secured to them by machine screws 78. Attached to the inside surface of this front plate, also by machine screws, is a pin receiving plate 80. Located in the middle of this adapter plate is a smooth bored hole 82 for receiving the connecting pin 28 with a fairly close tolerance fit. The other end of this pin is threadedly secured in a radial, threaded bore 84 of an annular member 86. This latter member has an outside diameter that is smaller than the inside diameter of the column 18 by a substantial amount that affords a no-contact clearance therewith, and an inside diameter that is larger than and provides a no-contact clearance with the ball screw 20. An annular nut-flange plate 88 is secured to the annular member by machine screws and has a threaded central bore which is concentric with the annular member 86 and adapted to receive the threaded end of the ball-bearing screw nut 26. The latter ball-bearing screw nut, engaged with the ball screw 20 may be of the well know type which is commercially available, and as shown in FIG. 5, it is completely enclosed within the screw-spindle connection assembly 32. Since the nut is fixed to the flange 88 and hence the annular member 86, rotation of the ball screw 20 causes the latter to move up or down and thereby move the attached pin 28 and spindle 30. In order to minimize the problem of wear and friction on the column due to heavy spindle loads, a series of three bearings 90 are provided on the pin-receiving plate 80. These bearings each have a shaft with a threaded end portion which is secured within a mating threaded hole in the plate 80, and are freely rotatable on the shaft. Each bearing is generally cylindrical and made of relatively hard, ware-resistant material. As shown in FIG. 7, two of the three bearings 90 are aligned vertically, but the third bearing **90*a* is offset horizontally. Thus, when the screw-spindle connection assembly 32 is installed, the two bearings 90 engage one side edge of the column slot 58 and the other bearing 90*a* engages its opposite side. No matter what load is placed on the spindle 30, any side forces that occur are applied to one edge of the column slot through one or more of the rotatable bearings 90 or 90*a*, and thus again, frictional forces that would otherwise tend to resist the movement of the spindle under heavy loads are minimized and the device 10 will function freely with minimum power requirements. To provide protection for the above described elements of the screw-spindle connection assembly 32, a preformed cover 92, preferably of plastic material, is adapted extend around the end plates 60 and 62 and abut against the side edges of the front plate 64**.

Figure 9:
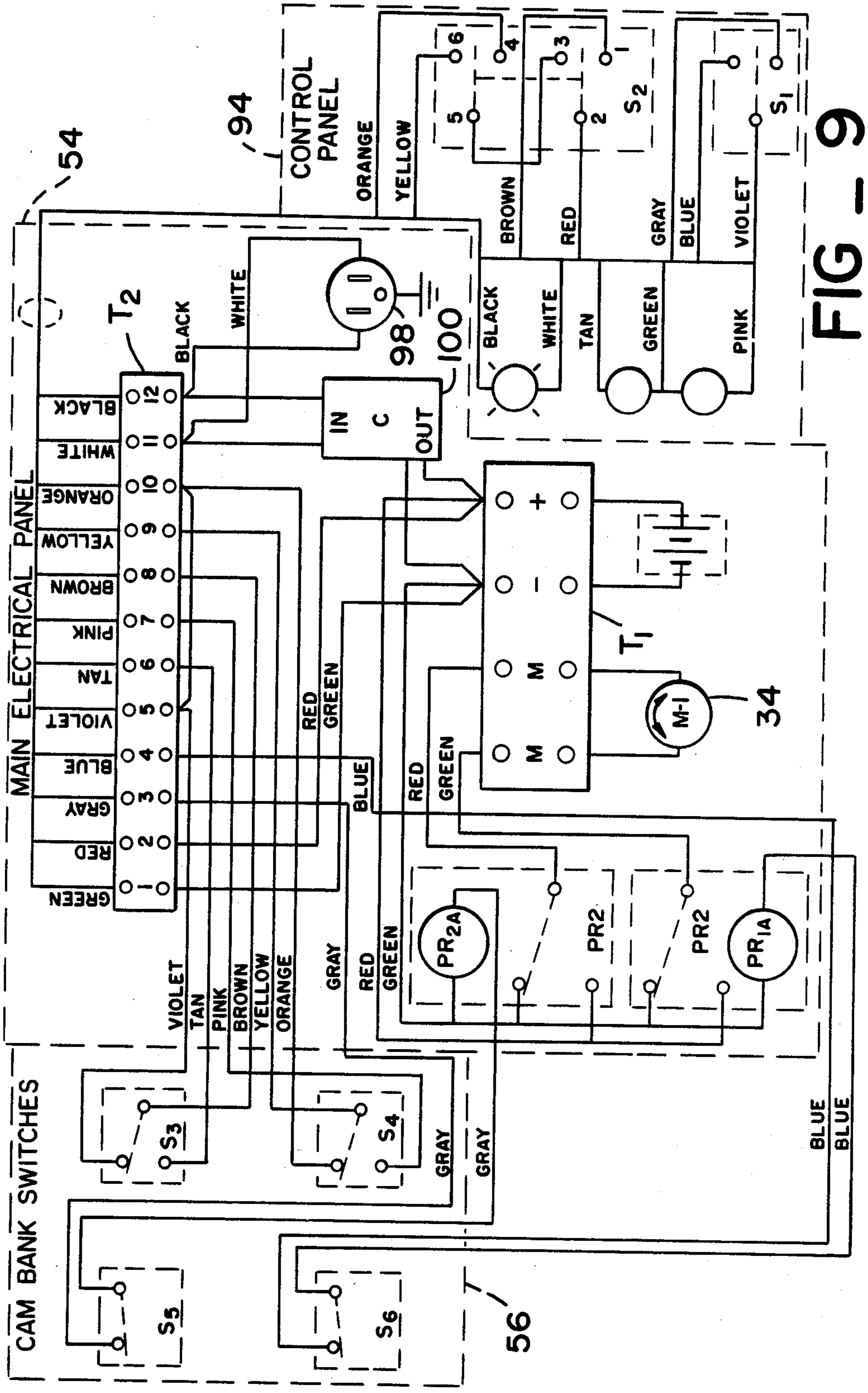
FIG. 9 is a schematic diagram of the electrical control system for the device of FIG. 1.

Turning to FIG. 9, an electrical circuit diagram is shown which illustrates the power and control system for the device 10. In this diagram, colors are designated for the different wires to indicate the various current paths of the components. The manually operable controls comprise a lift travel selector switch $S_1$ having UP, NEUTRAL and DOWN positions and a spindle stop selector switch $S_2$ having UPPER SPINDLE STOP, FULL TRAVEL and LOWER SPINDLE STOP positions. Handles for these switches $S_1$ and $S_2$ and also three indicator lights $L_1$, $L_2$ and $L_3$ are located on an operator's panel 94 attached to the upper transverse portion 96 of the handle 36. (See FIG. 2). The indicator light $L_1$ is energized at the upper spindle stop position, the indicator light $L_2$ is energized at the lower spindle stop position and the indicator light $L_3$ is a warning light that flashes intermittently when the batteries are being charged. On the main electrical panel 54 which is mounted on the platform 14 is a small terminal strip $T_1$ and a large terminal strip $T_2$ which provide for wiring interconnections as indicated on FIG. 9. Attached to a pair of terminals 11 and 12 at one end of strip $T_2$ is a plug-in receptacle 98 for outside A.C. power, and connected to these same terminals is a battery charger 100 whose output is connected through terminal strip $T_2$ to the battery. Other terminals 1–10 on the strip $T_1$ are connected on the input side from the switches $S_1$ and $S_2$ and on the output side to various cam bank switches on the rotary switch unit 56, as shown. The motor 34 for the device 10 is connected to a pair of terminals M on the terminal strip $T_2$ which are also connected to a power relay $PR_1$ for upward travel of the spindle and a power relay $PR_2$ for downward spindle travel. Both relays have separate coils $PR_{1A}$ and $PR_{2A}$ which are connected to a battery terminal on the strip $T_2$. Dual contacts of the two power relays are connected to the plus and minus terminals of the terminal strip $T_2$ and their respective coils are each connected to one of two cam limit switches on the rotary switch unit 56. Thus, one relay coil is connected to a bottom limit cam switch $S_5$ and the other relay coil is connected to a top limit cam switch $S_6$. When these limit switches are set, they define the upper and lower limits of travel for the spindle and when either limit is reached, the circuit through the respective relay coil is broken and the motor is automatically disconnected. Once the cam switches $S_5$ and $S_6$ are set, they are not expected to require adjustment by the user of the device 10.

Another pair of cam switches $S_3$ and $S_4$ of the switch unit 56 are adjustable by the user to vary the spindle travel to two preselected height positions. These positions can be adjusted so that the device will lift a heavy roll of material on the spindle and automatically stop where desired, such as the proper height for loading the roll onto a packaging machine. The adjustment of cam switches is accomplished by moving the spindle to the desired position and then moving the appropriate cam on the rotary switch to its actuation point at which a micro switch will be tripped. Other forms of rotary switches could also be used within the scope of the invention.

In operation, the device 10 may be pushed to a desired location such as supply stock of material roll at which the spindle can then be lowered or raised to facilitate the installation of a roll on the spindle. The device 10 may then be moved to a processing machine which requires a new material roll, such as plastic film. Assuming that the cam switches have already been preset as described, and assuming that the desired height for loading the machine is the present upper limit position, the procedure is as follows. The operator first moves the spindle selector switch $S_2$ to the up position setting and then moves the up-down switch $S_1$ to the up position. This acutates the motor, driving the ball screw 20 and causing the screw nut 28 and attached spindle 30 to rise. when the spindle reaches the present upper limit position, the upper-position cam switch will actuate and the spindle will stop. At this point, the material roll can be moved from the spindle directly onto the processing machine for use thereon. The spindle selector switch $S_2$ can now be moved to neutral and the up-down switch $S_1$ can be actuated to move the spindle to any new desired position.

From the foregoing, it is seen that a relatively simple but highly efficient device is provided for moving heavy objects such as large rolls of material up or down in a rapid, highly efficient manner. The device essentially eliminates the need for manual manipulation of such heavy unwieldy objects or rolls and thereby eliminates potential bodily injury and fatigue to workers as well as increases productivity.

To those skilled in the art to which this invention relates, many changes in construction and widely differing embodiments and application of the invention will suggest themselves without departing from the spirit and scope of the invention. The disclosures and the description herein are purely illustrative and are not intended to be in any sense limiting.

What is claimed is:

1. A device for lifting and transporting articles from one location to another comprising:

a tubular column with an elongated slot therein;

base means for supporting said column in an upright position and rotatable means attached to the underside of said base means;

a threaded ball screw supported for rotation within said column and a movable nut threadedly engaged with said screw;

motor means mounted on said base means;

drive means for interconnecting said motor means with said ball screw;

means extending transversely from said column for retaining an article to be lifted;

pin means extending through said slot for interconnecting said screw nut and said article retaining means;

support means for enclosing said screw nut and said pin means and for reducing friction on said tubular column due to a load applied to said article retaining means, said support means including a first series of rotatable bearing means for engaging on outer surface of said column and a second series of rotatable bearing means for engaging either edge of opposite side edges of said elongated slot in said column;

whereby rotation of said ball screw by said motor means causes vertical movement of said article retaining means and any article supported thereon relative to said column while said first and second bearing means afford minimal friction on said tubular column irrespective of the load being lifted.

2. The device as described in claim 1 wherein said article retaining means is an elongated cylindrical spindle for supporting heavy rolls of material.

3. The device as described in claim 1 including handle means attached to and extending upwardly from opposite sides of said base means having a U-shaped interconnecting portion at its upper end; and motor control means attached to said interconnecting portion.

4. The device as described in claim 1 wherein said drive means comprises a speed reduction unit connected to said motor means; a drive sprocket connected to an output shaft on said speed reduction unit; a driven sprocket connected to the lower end of said ball screw; and chain means interconnecting said drive sprocket and said driven sprocket.

5. The device as described in claim 1 wherein said support means comprises upper and lower end plates interconnected by a front plate, each of said end plates having an opening through which said column extends, a plurality of recesses formed in each said end plate at spaced apart locations around said opening therein, said first series of rotatable bearing means supported within each said recess and extending inwardly from the edge of said opening to engage the outer surface of said column.

6. The device as described in claim 1 wherein said support assembly further includes a block fixed to the inner side of said front plate and having a central opening for receiving said pin means; said second series of three rotatable bearing members being journaled in said block, two of said latter bearing members being vertically aligned and adapted to contact one edge of said elongated slot in said column, while the third said latter bearing member is horizontally offset from the first two said bearing members so as to contact the opposite edge of said elongated slot, thereby reducing friction with said slot due to heavy loads on said article retaining means.

7. The device as described in claim 3 including manually operable switch means on said control means attached to said handle means, and means for controlling upper and lower limits of travel of said article retaining means including presettable cam means on said drive means.

8. The device as described in claim 4 including first automatic switch means providing up and down maximum limit positions for said article retaining means, and second switch means for controlling movement of said article retaining means to preselected precise upper and lower locations on said column at which the motor will automatically stop to facilitate loading and unloading of the article retaining means.

9. The device as described in claim 7 wherein said drive means comprises a speed reduction unit connected to said motor means; said cam being switch means connected to said speed reduction unit and having adjustable means for setting the motor cutoff relative to preselected positions of said article retaining means.

* * * * *

UNITED STATES PATENT AND TRADEMARK OFFICE

CERTIFICATE OF CORRECTION

PATENT NO. : 4,593,883

DATED : June 10, 1986

INVENTOR(S) : RICHARD P. NELSON

It is certified that error appears in the above-identified patent and that said Letters Patent are hereby corrected as shown below:

Column 2, line 30, "like" should read --line--.
Column 2, line 40, "6" should read --5--.
Column 6, line 47, "on" should read --an--.
Column 8, line 19, delete "being".
Column 8, line 20, after "switch means" insert --being--.

Signed and Sealed this

*Nineteenth* Day of *August 1986*

[SEAL]

*Attest:*

DONALD J. QUIGG

*Attesting Officer* *Commissioner of Patents and Trademarks*